3,478,121
METHOD OF PURIFYING CUMENE FOR PREPARING PHENOL
Giancarlo Aglietti and Roberto Canavesi, Milan, Italy, assignors to Società Italiana Resine S.p.A., Milan, Italy
No Drawing. Filed Feb. 27, 1967, Ser. No. 619,023
Claims priority, application Italy, Mar. 9, 1966, 5,339/66
Int. Cl. C07c 7/00, 5/14
U.S. Cl. 260—674                                13 Claims

ABSTRACT OF THE DISCLOSURE

Method of freeing cumene from unsaturated and oxygenated impurities in one operation by carrying out a hydrogenation reaction on the impure cumene in the presence of nickel or molybdenum supported on alumina as catalyst. The cumene may have been produced in the impure form by the known process of forming phenol from cumene hydroperoxide. Impure cumene also results from this process. The main impurities are compounds such as alphamethylstyrene, methylisobutylketone and mesityl oxide. Stationary catalytic beds through which impure cumene and hydrogen are flowed may suitably be employed and the reaction may be carried out at temperatures between 250 and 300° C.

---

The invention concerns the purification of cumene. Impure cumene is recovered from processes for preparing phenol from cumene hydroperoxide by hydrolysis of the hydroperoxide in the presence of non-oxidised cumene and separation of the acid hydrolysis products. The present invention is particularly useful in recovering cumene from the recycle stream of that process. More particularly, the invention relates to the removal of the unsaturated and oxygenated compounds which are present, especially in the recycled cumene referred to above, by treatment with molecular hydrogen in the presence of catalysts.

In separation by rectification of the acid hydrolysis products in the synthesis of phenol via cumene, an acetone fraction, a phenol fraction and a cumene fraction are obtained, as is well known, together with quantities of alphamethylstyrene and oxygenated compounds, generally of a carbonyl type such as methylisobutylketone and mesityl oxide. The quantity of alphamethylstyrene present in the recycled cumene may be between 1 and 30% by weight, whereas the quantity of oxygenated compounds may amount to 1% or more. The presence of the latter is due to the difficulty of separation thereof by rectification.

The contamination of the recycled cumene by oxygenated products reduces the reaction rate of hydroperoxidation of cumene, thereby further increasing the side products, as it necessitates an increase in reaction temperature in order to obtain a fixed production.

Thus cumene which is recycled to the hydroperoxidation process should be deprived of its unsaturated and oxygenated compounds and it has now been found convenient to remove both in one operation. This results in economy in the fractionization of the acid hydrolysis products of cumene hydroperoxide which forms part of the process.

The invention provides an improved method of catalytic purification of cumene by hydrogenation which affords full removal of the unsaturated compounds, more particularly the hydrogenation of alphamethylstyrene to cumene, and full removal of the oxygenated compounds so that cumene of high purity is available for oxidation.

More particularly the method acocrding to the invention comprises treating cumene in the liquid phase in a catalytic bed essentially comprising nickel and molybdenum supported on alumina, with hydrogen or a molecular hydrogen containing gas at a temperature and pressure above ambient temperature and pressure.

The use of the above-mentioned catalysts which has long been known in industrial practice was generally limited to desulfurretting, denitrifying and deoxidising hydrogenation of petroleum fractions at high temperatures. It was further known that the activity of the catalyst increased upon a treatment with hydrogen sulfide before use. It has now been surprisingly found that these catalysts, even without any particular activation, can be utilised and in the process of the invention which requires a specific hydrogenating action and which is highly selective in respect of both unsaturated and oxygenated compounds at temperatures at which the catalysts normally do not exhibit an activity suitable for their use in industrial reactions.

The use of palladium deposited on active coal has previously been described as a catalyst for the hydrogenation wilth hydrogen of alphamethylstyrene to cumene. However, while the catalyst has proved highly selective and specific to the reaction it had not been possible to obtain a substantial reduction of the oxygenated compounds even under the drastic reaction conditions under which the mechanical properties of the catalyst are prejudiced.

Under the preferred operating conditions according to this invention the percentages in the catalyst of nickel and molybdenum in the form of oxides, referred to the alumina support, amount to 3.5–4.5% and 13–15% respectively.

The pressure of the hydrogenation is preferably between 20 and 80 kg./sq. cm., whereas the temperature should not be lower than 250° C. and can amount up to 300° C. Temperatures between 270° C. and 280° C. are preferred as they establish optimum reaction conditions which avoid incomplete reduction of oxygenating compounds due to excessively low temperatures and further avoid cracking processes due to excessively high temperatures. Under these conditions the selectivity of the hydrogenation process is practically total. Moreover, the catalyst as defined above maintains its properties unaltered for extremely long periods. In fact a laboratory test after 5,000 hours run showed that the catalyst maintained its mechanical properties as well as its selectivity and effectiveness unaltered. A measurement of its active surface before and after use supplied practically equal values. The best results are obtained with a stationary catalytic bed or, preferably, with a plurality of stationary beds through which the mixture to be hydrogenated successively flows, the beds being advantageously of increasing thickness in the direction of flow. In order to avoid a dangerous rise in temperature the cumene supplied should preferably contain alphamethylstyrene in an amount of only 10% to 20% by weight. Where the alphamethylstyrene content in the supplied cumene is higher the cumene supply can bed iluted with purified cumene in order to re-establish the above-mentioned conditions.

A satisfactory control of the temperature can be obtained also by supplying a fraction of non-purified and/or purified cumene at a temperature below the reaction temperature past the catalytic bed or each of the catalytic beds. The gas and liquid are caused to flow concurrently, usually downwardly in the reactor which is of tubular form, in ratios such that there is excess hydrogen, more particularly 500 to 1,500 N liters hydrogen to 1 liter cumene. Hydrogen or gases containing hydrogen in a quantity exceeding about 80% can be employed.

The spatial velocity of the cumene may range within rather wide limits, usually 0.2 to 0.8 liter cumene to 1 liter catalyst per hour.

The invention will now be illustrated by the following example.

EXAMPLE

A laboratory apparatus comprising a steel tube 30 cm. in height and 2.8 cm. in diameter containing 200 ml. nickel-molybdenum catalyst, as previously described, was plunged into a thermostated molten salt bath at a temperature of about 275° C. 70 ml./hour approximately cumene were fed from the top, the feed comprising 70% recycled cumene from the method of preparing phenol via cumene hydroperoxide, and 30% purified cumene from a previous run. The pressure in the reactor was maintained at about 40 atm. hydrogen which was fed concurrently with the cumene at a rate of about 70 N liters/hour.

The reaction product was analysed after cooling. The recycled cumene contained 22.4% alphamethylstyrene but after treatment the value of the bromine number was lower than 0.1.

The oxygenated compounds originally present in a quantity equalling 6500 p.p.m. were fully absent after the treatment.

What we claim is:

1. A process for the purification of cumene comprising treating impure liquid cumene containing as impurities unsaturated and oxygenated compounds of hydrogen or a molecular hydrogen containing gas in the presence of a catalyst bed essentially consisting of nickel oxide and molybdenum oxide supported on alumina at a temperature between 250°–300° C. and at a pressure between 20–80 kg./sq. cm.

2. A process as claimed in claim 1, wherein said cumene is obtained as a side product in the manufacture of phenol from cumene hydroperoxide.

3. A process as claimed in claim 1, wherein said cumene contains from 1 to 30% by weight of alpha-methylstyrene.

4. A process as claimed in claim 1, wherein said cumene contains up to 1% by weight oxygenated compounds.

5. A process for the purification of cumene comprising treating impure liquid cumene containing as impurities up to 1% by weight oxygenated compounds and from 10 to 20% by weight alphamethylstyrene, with hydrogen or a molecular hydrogen containing gas in the presence of a catalytic bed essentially consisting of nickel oxide and molybdenum oxide supported on alumina at a temperature between 250 and 300° C., and at a pressure between 20–80 kg./sq. cm.

6. A process as claimed in claim 5 in which the temperature is between 270 and 280° C.

7. A process as claimed in claim 5 in which the catalyst is in an unactivated form.

8. A process for the purification of cumene comprising passing liquid impure cumene through a plurality of stationary catalytic beds together with hydrogen or a molecular hydrogen containing gas at a temperature between 250 and 300° C. and at a pressure between 20 and 80 kg./sq. cm. each of said catalytic beds essentially consisting of unactivated nickel oxide, 3.5–4.5 weight percent and molybdenum oxide, 13–15 weight percent supported on alumina.

9. A process as claimed in claim 8 in which each of said catalytic beds is deeper than the previous bed in the direction of cumene flow.

10. A process as claimed in claim 8 in which the spatial velocity of said cumene through the catalytic beds is between 0.2 and 0.8 liter to 1 liter catalyst per hour.

11. A process as claimed in claim 8 in which 500 to 1500 N liters hydrogen to 1 liter of cumene is used.

12. A process as claimed in claim 8 in which said molecular hydrogen containing gas contains over 80% hydrogen.

13. A process as claimed in claim 8 in which said hydrogen or said molecular hydrogen containing gas and said cumene flow concurrently.

References Cited

UNITED STATES PATENTS 2,894,048  7/1959  Shuman.
3,379,767  4/1968  Kreiter et al.

DELBERT E. GANTZ, Primary Examiner
CURTIS R. DAVIS, Assistant Examiner